May 28, 1968  P. BANDUKWALLA  3,385,512

BLADED ROTOR

Filed Sept. 13, 1966  2 Sheets-Sheet 1

INVENTOR.
PHIROZE BANDUKWALLA
BY Maybee & Legris
ATTORNEYS

May 28, 1968 P. BANDUKWALLA 3,385,512
BLADED ROTOR

Filed Sept. 13, 1966 2 Sheets-Sheet 2

INVENTOR.
PHIROZE BANDUKWALLA
BY Maybee & Legris
ATTORNEYS

3,385,512
BLADED ROTOR
Phiroze Bandukwalla, Toronto, Ontario, Canada, assignor, by mesne assignments, to Orenda Limited, Toronto, Ontario, Canada, a company of Canada
Filed Sept. 13, 1966, Ser. No. 579,031
7 Claims. (Cl. 230—134)

ABSTRACT OF THE DISCLOSURE

A bladed rotor having a central hub is provided with a plurality of blade structures each consisting of a series of blade elements on a common root segment. The root segments are inserted radially into a slot in the hub into end to end abutting relation with one another, and are retained therein, means being provided to prevent radial or circumferential displacement of the root segments.

---

This invention relates to bladed rotors, such as rotors for compressors and like machines. The invention is especially applicable to a one piece cast rotor having blades integrally cast with common root segments, which segments are mountable and demountable upon the rotor.

It is a primary object of the invention to provide an inexpensive rotor, which may be produced by precision casting methods, of high quality and performance and of a design which reduces machining to a minimum number of operations having easy tolerances.

It is a further object of the invention to provide a rotor wherein blade vibration is reduced due to the ganging of a series of blades on a common root as opposed to the practice of fitting individually rooted blades.

A still further object of the invention is to provide a rotor which is easy to assemble, disassemble and service.

A bladed rotor according to the present invention comprises a central hub, such as a wheel or a drum, having one or more axially spaced continuous circumferential slots in its periphery, and a plurality of blade structures each consisting of a series of blade elements on the common root segment, which root segments are inserted radially into the slot or slots into end to end abutting relation with one another, and removable key members which engage between registering grooves in the side walls of the slot and the sides of the root segments.

Two embodiments of the invention will now be described, by way of example only, with reference to the accompanying drawings, in which like reference numerals refer to like parts throughout the several views, and in which.

Figure 1:
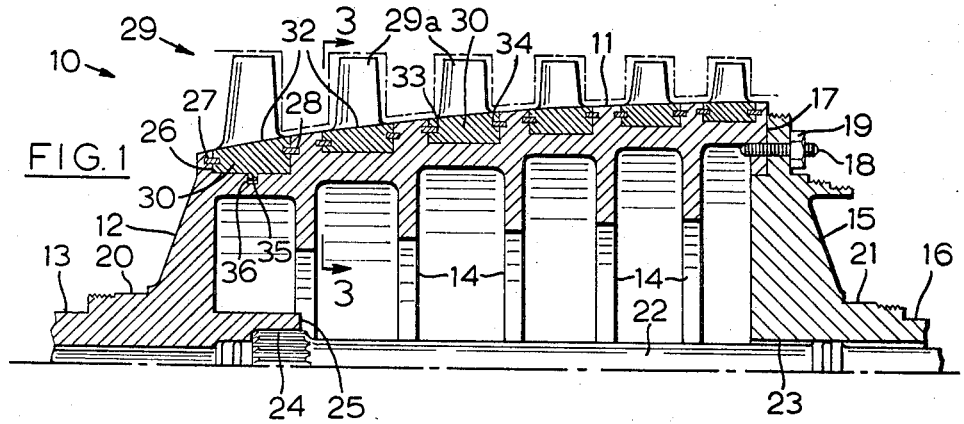
FIG. 1 is a sectional elevation of a portion of a rotor according to the first embodiment of the invention.

Referring now more particularly to FIG. 1, a bladed rotor includes a central hub generally indicated at 10, which hub comprises a substantially frusto-conical, hollow drum 11 with an integrally cast front end web 12 having a coaxial stub shaft 13 extending therefrom. The drum 11 is internally reinforced by integral, spaced-apart, annular flanges 14. A rear end web 15, having a coaxial stub shaft 16, is spigoted and releasably attached to an end flange 17 of the drum 11 by a series of studs 18 and nuts 19. A portion 20 of the stub shaft 13 is adapted to receive bearing means (not shown) for the rotatable support of the front end of the rotor. Similarly, a portion 21 of stub shaft 16 is adapted to receive bearing means (not shown) for the rotatable support of the rear end of the rotor. Driving means for the rotor comprises a splined shaft 22 which passes through a coaxial bore 23 in stub shaft 16 to engage a splined bore 24 in a boss 25 extending coaxially inwardly of the front web 12. The outer periphery of the drum 11 is formed with a series of axially spaced-apart, continuous, circumferential slots such as 26. Shallow, continuous grooves such as 27 and 28 are machined in the radial side walls of the slots 26 for a purpose to be described.

Figure 2:
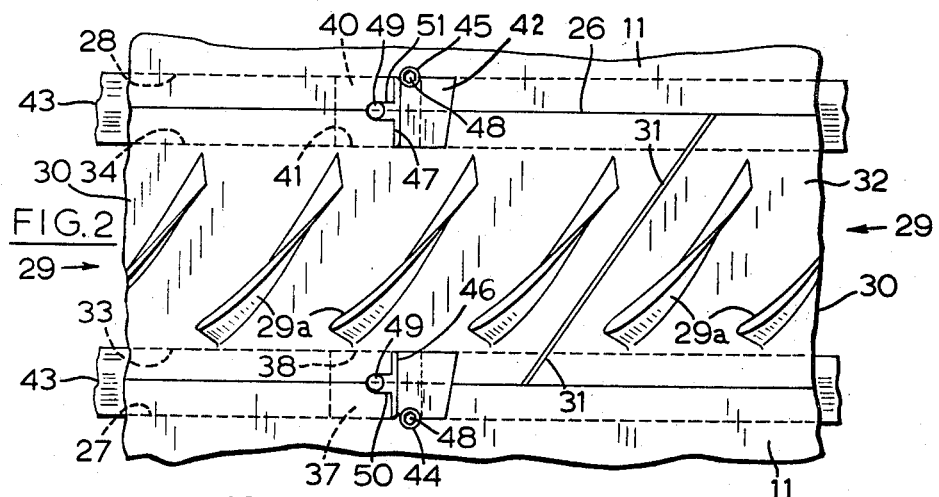
FIG. 2 is a developed and enlarged plan view of a portion of the rotor shown in FIG. 1.
Figure 3:
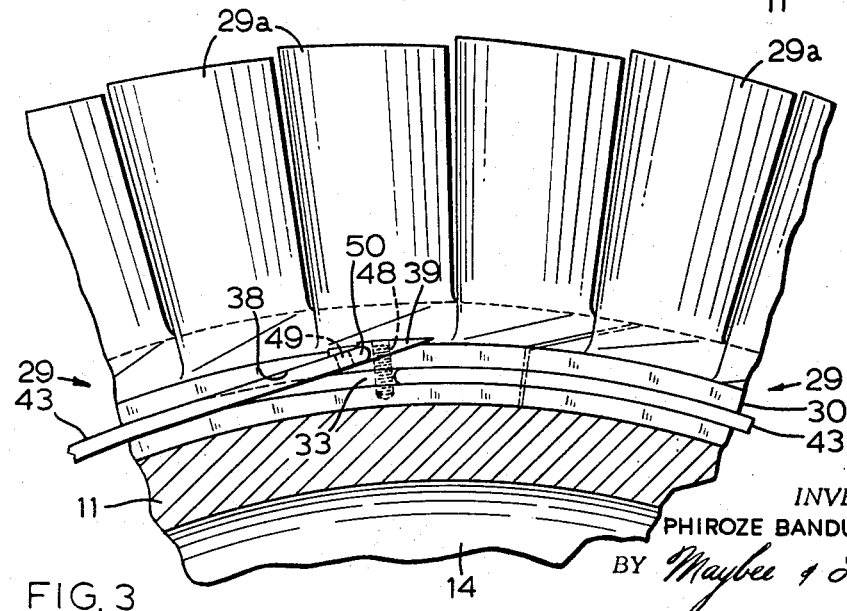
FIG. 3 is an enlarged section on line 3—3 in FIG. 1.

As best understood from FIGS. 2 and 3, a plurality of blade structures generally indicated at 29 each have a series of blade elements such as 29a precision cast integrally with common root segments 30. The root segments may be of any arcuate length equally divisible into the circumferential length of the slots 26, in which they are mounted, up to a half ring. This, of course, is the maximum size which will permit of assembly on the rotor drum. Blade rings of the preferred embodiment are half rings, their ends being obliquely formed as shown at 31 in FIG. 2. The root segments 30 are machined so that they are insertable radially into the appropriate slot 26 on the drum 11 into end to end abutting relation with one another, their upper surfaces 32 forming a continuation of the outer surface of the drum. The radial surfaces or sides of the root segments are formed with arcuate grooves such as 33 and 34, which register with grooves 27 and 28, respectively, in the side walls of the slots 26. The root segments are restrained from circumferential movement within the slots by a single dowel pin 35, projecting from the inner surface or base of one of a pair of root segments and engaging in a locating hole 36 in the base of the mounting slot (see FIG. 1). Locating holes in successive mounting slots would be at stations equi-angularly disposed around the circumference of the drum so as to preserve the balance of the rotor.

Registering grooves 37 and 38 extend tangentially from grooves 27 and 33 through the outer surface of drum 11 and upper surface 32 of the root segment 30 respectively, to provide an entry ramp 39 communicating with the grooves and terminating in an opening at the periphery of the drum. Similarily, grooves 40 and 41 extend tangentially from grooves 28 and 34 through the drum and root segment surfaces to provide an entry ramp 42 to the grooves. The root segments are retained in their respective slots 26 by flexible elongated strip members 43, which are inserted through the openings in the periphery of the drum, fed into entry ramps 39 and 42, and forced around the cooperating grooves 27 and 33, and 28 and 34. The strip members are flexible in the direction of their length and substantially rigid across their width. The edges of the strip members 43 project axially into the registering grooves 27 and 33, and 28 and 34, so that the strip members act as key members to key the root segments against radial displacement. The strip members 43 are stopped short of tapped holes 44 and 45, in the drum 11, and are then cut off adjacent an edge 46 of entry ramp 39 and an edge 47 of entry ramp 42. Grub screws 48 are entered into the holes 44 and 45 to retain the strip members in place during rotation of the rotor.

In order to disassemble the rotor the strips 43 may be removed by drilling holes 49 in the ends of the strips exposed by short slots 50 and 51 formed in edges 46 and 47 of the entry ramps. The grub screws 48 are removed and a special tool adapted to engage holes 49 is utilized to withdraw the strips until the free ends can be gripped by a hand tool of the pliers type. Alternatively, the welding rod of an electric arc welding apparatus may be fused to the end of a strip, which can then be withdrawn. With the strips 43 removed the root segments can be withdrawn from their mounting slots with ease.

Figure 4:
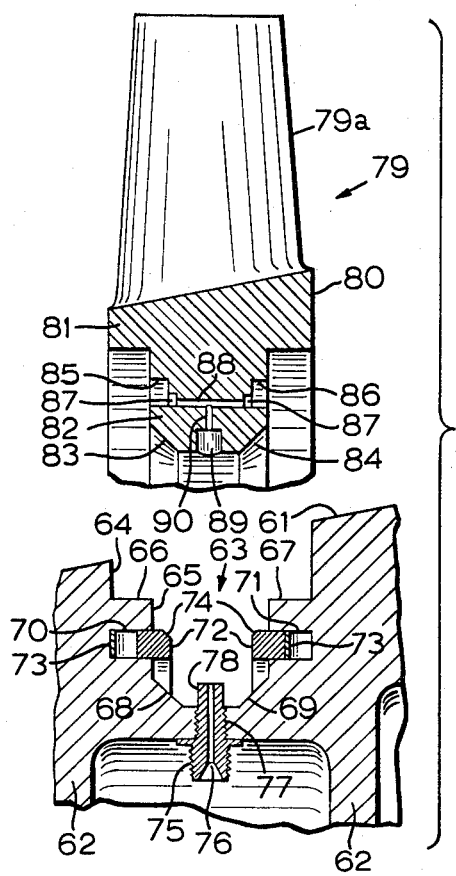
FIG. 4 is an enlarged exploded section of a portion of the rotor according to the second embodiment of the invention, the figure showing a blade structure removed from its mounting slot.
Figure 5:
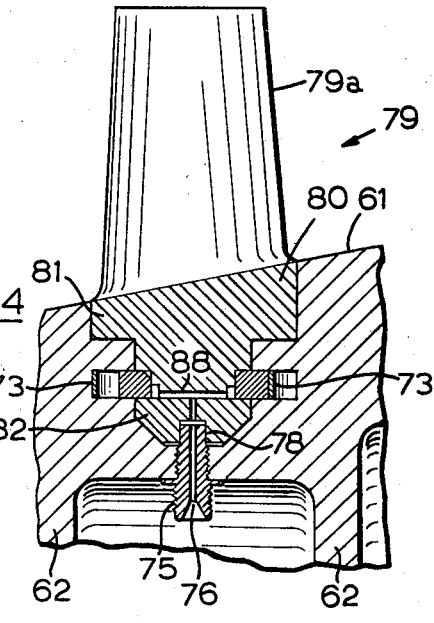
FIG. 5 is a view similar to FIG. 4, but with the blade structure fitted into its mounting slot.
Figure 6:
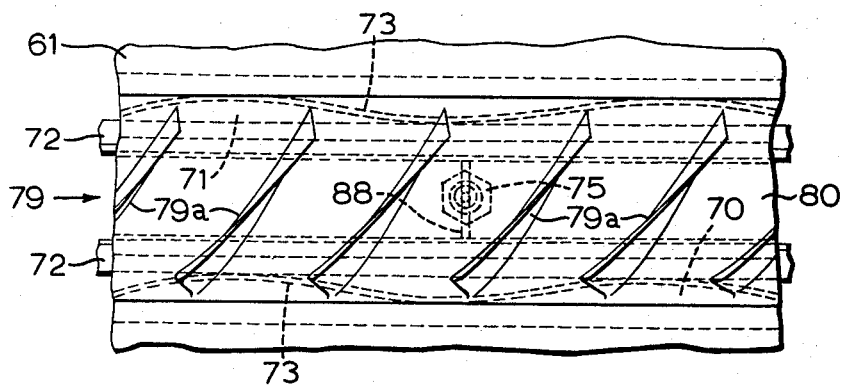
FIG. 6 is a developed plan view of a portion of the rotor shown in FIGS. 4 and 5.

Referring now to FIGS. 4, 5 and 6, which illustrate the second embodiment of the invention, a portion of a rotor such as that shown in FIG. 1, is indicated at 61 with portions of internal reinforcing flanges being shown at 62. One of a series of axially spaced-apart, circumferential root segment mounting slots, generally indicated at 63, comprises an outer, wide slot portion 64 and a narrow inner slot portion 65, which together define circumferential shoulders 66 and 67. The bottom angles of the inner slot portion 65 have deep fillets 68 and 69. Deep continuous grooves 70 and 71 are machined in the side walls of the inner slot 65. A pair of square-section half rings 72 are slidably carried in the groove 70 with their ends abutting one another. The half rings are backed by a wavy spring washer 73 in two portions with end clearance there-between to allow flexure thereof. Similar half rings 72 are slidably carried in groove 71, these half rings also being backed by a wavy spring washer 73 in two portions. The upper edges of the half rings 72 are chamfered at 74. A threaded pipe union 75 having a central axial bore 76 is housed in a threaded bore 77 in the drum 11. One end 78 of the union projecting into the base of the inner slot portion 65 is formed as a plain dowel pin for locating a root segment as will be described.

The blade structures 79 are precision cast and include blade elements 79a and root segments 80, each root segment comprising an outer portion 81, which is formed to cooperate with the outer slot portion 64 and to seat on shoulders 66 and 67, and an inner flange portion 82 formed to cooperate with inner slot portion 65. The inner edges of the flange portion 82 are heavily chamfered at 83 and 84 to seat on fillets 68 and 69 in the slot. Shallow continuous grooves 85 and 86 are machined in the radial surfaces or sides of the flange 82; these grooves are coextensive with and register with, the grooves 70 and 71 respectively when the root segments are housed in their slots, as shown in FIG. 5. Narrow subgrooves 87 are formed in the bottom surfaces of grooves 85 and 86 and these are interconnected by a small-bore, transverse duct 88. A blind bore 89, drilled radially in the inner flange 82 provides a locating hole for the hollow dowel pin 78, and a small bore duct 90 extending from the bore 89 communicates with the transverse duct 88.

The assembly of the blade structures on the rotor drum is easily carried out by offering up the root segments to their respective slots and pressing them home. Locking is automatic, as will now be described. A root segment having a locating dowel hole 89 therein is offered up to its slot 63 in the rotor drum with the hole 89 aligned with the dowel pin 78. When the flange 82 enters the inner slot portion 65, the root segment is pressed home. Chamfers 83 and 84 contact the chamfers 74 and the rings 72 and force the rings deeper into their grooves, compressing the wavy spring washers 73. The hole 89 and dowel pin 78 will now have to be finally aligned by feel, and to this end a very slight taper on the dowel and hole would be an advantage. Once aligned, the root segment 80 can be pressed right home. The rings 72 will have been forced right into their grooves 70 and 71 by the flange 82, but as soon as the grooves 85 and 86 in the side walls of the root segment align themselves with the grooves 70 and 71 respectively, the rings 72 will enter the grooves 85 and 86 under the urging of the wavy spring washers 73, to the position shown in FIG. 5, locking the segment in place. It will be found advantageous to enter the root segments of both blade sectors at the same time and to "snap" them home simultaneously.

In order to remove the root segments from the mounting slots, a source of fluid pressure is required. The fluid is preferably a liquid and the pressure source is a small hydraulic hand pump. A hose (not shown) is connected from the pump of the union 75 and fluid is forced up through the bore 76 in the union and the transverse duct 88 into the groove 87. The fluid, which may be low viscosity oil, will travel around the grooves 87 forcing air out through the normal fitting clearances between the rings 72 and their grooves. There will be some leakage of oil but this will be quite slow and the pressure will build up in the grooves and act upon the rings 72 to retract them outwardly from grooves 85 and 86 and deeper into grooves 70 and 71 against the resilience of the wavy spring washers. At the point when the rings are flush with the side walls of inner slot portion 65, the root segments can be withdrawn and, as in the first embodiment, it will be advantageous if a light withdrawal force is applied simultaneously on both blade segments.

The pairs of half rings 72 constitute annular key members, which project axially into the registering grooves 70 and 85, and 71 and 86, and so key the root segments against radial displacement. The annular key members need not comprise pairs of half rings as shown, but may be split into any number of outward lengths not greater than half the circumferential length of the slot, the lengths abutting one another at their ends.

What I claim as my invention is:

1. A bladed rotor comprising a central hub having a continuous circumferential slot in its periphery, the slot having radial side walls each formed with a continuous annular groove, a plurality of blade structures each consisting of a series of blade elements on a common root segment, the root segments being insertable radially into the slot into end to end abutting relation with one another, each root segment having a pair of sides which cooperate with the side walls of the slot and each side being formed with an arcuate groove registering with the groove in the cooperating side wall of the slot, the registering grooves defining at each side of the slot a continuous circumferential passage terminating in an entry ramp and an opening at the periphery of the central hub, an elongated strip member, which is flexible in the direction of its length and substantially rigid in a direction transverse to its length, extending throughout the length of each passage the strip member being insertable through said peripheral opening and entry ramp and having edges which extend along and project axially into the registering grooves of the root segments and the side wall of the slot to key the root segments against radial displacement, and dowelling means for preventing circumferential displacement of the root segments relative to the central hub.

2. A bladed rotor according to claim 1, wherein the radial side walls of the slot are stepped to define an outer wide slot portion and an inner narrow slot portion and a pair of circumferential shoulders between said slot portions, each root segment comprising an outer wide portion and an inner narrow portion which respectively fit into said slot portions with the outer portion of the root segment seating on the shoulders.

3. A bladed rotor according to claim 1, wherein the dowelling means consist of a dowel pin projecting from the base of a root segment and engaging with a locating hole in the base of the circumferential slot.

4. A bladed rotor according to claim 2, wherein the elongated strip members are retained in the passages by grub screws inserted into the periphery of the central hub adjacent said openings, the ends of the strip members abutting against the grub screws.

5. A bladed rotor comprising a central hub having a continuous circumferential slot in its periphery, the slot having radial side walls each formed with a continuous annular groove, a plurality of blade structures each consisting of a series of blade elements on a common root segment, the root segments being insertable radially into the slot into end to end abutting relation with one another, each root segment having a pair of sides which cooperate with the side walls of the slot and each side being formed with an arcuate groove registering with the groove in the cooperating side wall of the slot, annular key members located in the grooves in the side walls of the slot and projecting axially into the registering grooves of the root segments to retain the latter against radial displacement, the key members being resiliently biased into engagement with the grooves of the root segments, each key member being split into arcuate lengths not greater than half the circumferential length of the annular slot, and dowelling means for preventing circumferential displacement of the root segments relative to the central hub.

6. A bladed rotor according to claim 5, wherein the key members are resiliently biased into engagement with the grooves of the root segments by wavy spring washers located in the grooves in the side walls of the slot behind the key members.

7. A bladed rotor comprising a hollow drum having a continuous circumferential slot in its periphery, the slot having a base and radial side walls each formed with a continuous annular groove coaxial with the drum, a plurality of blade structures each consisting of a series of blade elements on a common root segment, the root segments being insertable radially into the slot into end to end abutting relation with one another, each root segment having a base which cooperates with the base of the slot and a pair of sides which cooperate with the side walls of the slot, and each side being formed with an arcuate groove registering with the groove in the cooperating side wall of the slot, annular key members located in the grooves in the side walls of the slot and projecting axially into the registering grooves of the root segments to retain the latter against radial displacement, the key members being resiliently biased into engagement with the grooves of the root segments, each key member being split into arcuate lengths not greater than half the circumferential length of the annular slot, a dowel pin having an axial bore, the dowel pin projecting through the base of the slot and engaging a locating hole in the base of a root segment, the root segment being formed with interior ducts extending between the locating hole and the arcuate grooves, which ducts constitute means for transmitting fluid pressure to the grooves for retracting the key members against their resilient bias.

References Cited

UNITED STATES PATENTS

| | | | |
|---|---|---|---|
| 1,466,324 | 8/1923 | Wilkinson | 253—77 |
| 1,606,029 | 11/1926 | Herr | 253—77 |
| 2,755,062 | 7/1956 | Hill | 253—77 |
| 2,713,991 | 7/1955 | Secord et al. | 253—77 |

FOREIGN PATENTS

| | | |
|---|---|---|
| 618,011 | 2/1949 | Great Britain. |
| 612,938 | 11/1960 | Italy. |

HENRY F. RADUAZO, *Primary Examiner.*